US012708925B2

(12) United States Patent
Satake et al.

(10) Patent No.: US 12,708,925 B2
(45) Date of Patent: Aug. 18, 2026

(54) SUBSTRATE PROCESSING METHOD AND SUBSTRATE PROCESSING APPARATUS

(71) Applicant: EBARA CORPORATION, Tokyo (JP)

(72) Inventors: Masayuki Satake, Tokyo (JP); Masayuki Nakanishi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 192 days.

(21) Appl. No.: 18/685,640

(22) PCT Filed: Jul. 14, 2022

(86) PCT No.: PCT/JP2022/027660
§ 371 (c)(1),
(2) Date: Feb. 22, 2024

(87) PCT Pub. No.: WO2023/026719
PCT Pub. Date: Mar. 2, 2023

(65) Prior Publication Data
US 2024/0351062 A1 Oct. 24, 2024

(30) Foreign Application Priority Data
Aug. 27, 2021 (JP) ................................ 2021-138807

(51) Int. Cl.
*B05C 11/00* (2006.01)
*B05C 9/14* (2006.01)
(Continued)

(52) U.S. Cl.
CPC ............ *B05C 11/1005* (2013.01); *B05C 9/14* (2013.01); *B05D 1/002* (2013.01); *B05D 3/0254* (2013.01)

(58) Field of Classification Search
None
See application file for complete search history.

(56) References Cited

U.S. PATENT DOCUMENTS 8,119,500 B2 2/2012 Yang et al.
2008/0200100 A1 8/2008 Takahashi et al.
(Continued)

FOREIGN PATENT DOCUMENTS

CN 101877305 A1 11/2010
CN 108025515 A 5/2018
(Continued)

OTHER PUBLICATIONS

Supplemental European Search Report for EP 22861010 dated Jul. 2, 2025.

(Continued)

*Primary Examiner* — Alexander M Weddle
(74) *Attorney, Agent, or Firm* — Chrisman Gallo Tochtrop LLC

(57) ABSTRACT

The present application relates to a substrate processing apparatus and a substrate processing method for suppressing cracking and chipping of a laminated substrate manufactured by bonding substrates, and more particularly to a technique of applying a filler to a gap formed between edge portions of the substrates constituting the laminated substrate. The method includes: applying the filler to a gap between an edge portion of the first substrate and an edge portion of the second substrate; curing the applied filler; generating, by an infrared imaging device, an image of an edge portion of the laminated substrate to which the filler is applied; and determining a filling state of the filler applied to the gap between the edge portion of the first substrate and the edge portion of the second substrate based on the image.

18 Claims, 13 Drawing Sheets

(51) Int. Cl.

| | |
|---|---|
| ***B05C 11/10*** | (2006.01) |
| ***B05D 1/00*** | (2006.01) |
| ***B05D 3/02*** | (2006.01) |

(56) References Cited

U.S. PATENT DOCUMENTS

| | | | | |
|---|---|---|---|---|
| 2009/0079038 | A1 | 3/2009 | Schneegans et al. | |
| 2009/0196489 | A1 | 8/2009 | Le | |
| 2014/0242779 | A1 | 8/2014 | Nakamura et al. | |
| 2018/0269174 | A1* | 9/2018 | Fathi .................... | B23K 26/354 |
| 2018/0321027 | A1 | 11/2018 | Hashizume et al. | |

FOREIGN PATENT DOCUMENTS

| | | | |
|---|---|---|---|
| CN | 109219865 | A | 1/2019 |
| CN | 111063633 | A | 4/2020 |
| JP | H05160340 | A * | 6/1993 |
| JP | H05-304062 | A | 11/1993 |
| JP | 2006-278807 | A | 10/2006 |
| JP | 2011-066283 | A | 3/2011 |
| JP | 2012-042431 | A | 3/2012 |
| JP | 2012216589 | A * | 11/2012 |
| JP | 2015-143916 | A | 8/2015 |
| JP | 2016-051779 | A | 4/2016 |
| WO | 2009/097494 | A1 | 8/2009 |
| WO | 2017/047346 | A1 | 3/2017 |

OTHER PUBLICATIONS

International Search Report issued in Patent Application No. PCT/JP2022/027660 dated Sep. 20, 2022.

* cited by examiner

SUBSTRATE PROCESSING METHOD AND SUBSTRATE PROCESSING APPARATUS

TECHNICAL FIELD

The present invention relates to a substrate processing method and a substrate processing apparatus for suppressing cracking and chipping of a laminated substrate manufactured by bonding substrates, and more particularly to a technique of applying a filler to a gap formed between edge portions of the substrates constituting the laminated substrate.

BACKGROUND ART

In recent years, in order to achieve higher density and higher functionality in semiconductor devices, three-dimensional packaging technology, in which substrates are laminated and integrated three-dimensionally, has been developed. For example, in the three-dimensional packaging technology, a device surface of a first substrate on which integrated circuits and electrical wires are formed is bonded to a device surface of a second substrate on which integrated circuits and electrical wires are formed. After the first substrate is bonded to the second substrate, the second substrate is thinned by a polishing apparatus or a grinding apparatus. In this manner, integrated circuits can be stacked in a direction perpendicular to the device surfaces of the first substrate and the second substrate.

In the three-dimensional packaging technology, three or more substrates may be bonded to each other. For example, a third substrate may be bonded to the second substrate after the second substrate bonded to the first substrate has been thinned, and then the third substrate may be thinned. In this specification, a substrate in a form of substrates bonded to each other may be referred to as a "laminated substrate". Generally, an edge portion of a substrate is polished in advance in a rounded shape or a beveled shape in order to prevent cracking or chipping of the edge portion. When the second substrate having such a shape is grinded, an acute edge is formed in the second substrate as a result of grinding. This acute edge (hereinafter referred to as a knife-edge portion) is constituted by a grinded back surface and a circumferential surface of the second substrate. Such a knife-edge portion is likely to be chipped by a physical contact, and the laminated substrate itself may be broken during transportation of the laminated substrate. Furthermore, insufficient bonding between the first substrate and the second substrate may cause the second substrate to be cracked during grinding.

Thus, a filler is applied to the edge portion of the laminated substrate before the second substrate is grinded in order to prevent the knife-edge portion from cracking or chipping. The filler is applied to a gap between an edge portion of the first substrate and an edge portion of the second substrate. The filler can support the knife-edge portion that has been formed after the second substrate is grinded, and can prevent cracking or chipping of the knife-edge portion.

CITATION LIST

Patent Literature

Patent document 1: Japanese laid-open patent publication No. H05-304062

SUMMARY OF INVENTION

Technical Problem

However, when the filler is applied to the gap between the edge portion of the first substrate and the edge portion of the second substrate, a preset applying condition may causes a filling failure, such as lacking of the filler or over-applying of the filler. If the laminated substrate is processed in a subsequent process with the filling failure, the laminated substrate may be damaged, and as a result, the laminated substrate or a process performance may be adversely affected. Conventionally, filling of the filler that has been applied to the laminated substrate is checked after the application of the filler has been completed, and there were some cases that the laminated substrate should be destroyed.

It is therefore an object of the present invention to provide a substrate processing method and a substrate processing apparatus capable of monitoring a filling state of a filler in a gap between an edge portion of a first substrate and an edge portion of a second substrate while applying the filler to the gap.

Solution to Problem

In an embodiment, there is provided a substrate processing method of applying a filler to a laminated substrate having a first substrate and a second substrate bonded to each other, comprising: applying the filler to a gap between an edge portion of the first substrate and an edge portion of the second substrate; curing the applied filler; generating, by an infrared imaging device, an image of an edge portion of the laminated substrate to which the filler is applied; and determining a filling state of the filler in the gap based on the image.

In an embodiment, determining the filling state comprises determining the filling state based on a size of the filler in a preset target region on the image.

In an embodiment, applying of the filler is terminated based on the filling state.

In an embodiment, the substrate processing method further comprises additionally applying the filler based on the filling state.

In an embodiment, the substrate processing method further comprises counting the number of voids generated in the filler on the image, and determining that an abnormally has occurred when the number of voids has reached an acceptable value.

In an embodiment, applying of the filler, curing of the filler, and generating of the image is performed while rotating the laminated substrate.

In an embodiment, an applying condition for the filler is changed based on the filling state.

In an embodiment, the image is generated at each of measurement points of the laminated substrate while the laminated substrate makes one revolution, and an applying condition for the filler in at least one of the measurement points is changed based on the filling state at each of the measurement points and location information on the measurement points.

In an embodiment, the substrate processing method further comprises changing an applying condition for the filler in a next laminated substrate based on the filling state.

In an embodiment, the applying condition includes at least one of a total amount of the filler to be applied, a shape of a filler emitting port of an application device configured to apply the filler, a distance between the laminated substrate and the filler emitting port, an amount of the filler to be emitted from the filler emitting port per unit time, and a rotation speed of the laminated substrate.

In an embodiment, the infrared imaging device is configured to emit infrared light approximately perpendicularly to a bonding surface of the first substrate and the second substrate of the laminated substrate.

In an embodiment, there is provided a substrate processing apparatus for applying a filler to a laminated substrate having a first substrate and a second substrate bonded to each other, comprising: a filler application module configured to apply the filler to the laminated substrate; and an operation controller configured to control an operation of the filler application module, wherein the filler application module includes: a substrate holder configured to hold the laminated substrate; an application device configured to apply the filler to a gap between an edge portion of the first substrate and an edge portion of the second substrate; a curing device configured to cure the applied filler; and an infrared imaging device configured to generate an image of an edge portion of the laminated substrate to which the filler is applied, and the operation controller is configured to determine a filling state of the filler applied to the gap based on the image.

In an embodiment, the operation controller is further configured to instruct the filler application module based on the filling state to cause the application device to terminate application of the filler.

In an embodiment, the operation controller is further configured to instruct the filler application module based on the filling state to additionally apply the filler.

In an embodiment, the filler application module further includes a rotating mechanism configured to rotate the substrate holder.

In an embodiment, the operation controller is configured to change an applying condition for the filler based on the filling state.

Advantageous Effects of Invention

According to the present invention, the filler is applied to the laminated substrate while the filling state of the filler is monitored. Therefore, the application of the filler can be terminated at an appropriate timing. Moreover, additional application of the filler or changing of the applying condition can be performed as needed. As a result, appropriate filling of the filler can be achieved.

DESCRIPTION OF EMBODIMENTS

Hereinafter, embodiments of the present invention will be described in detail with reference to the drawings.

Figure 1A:
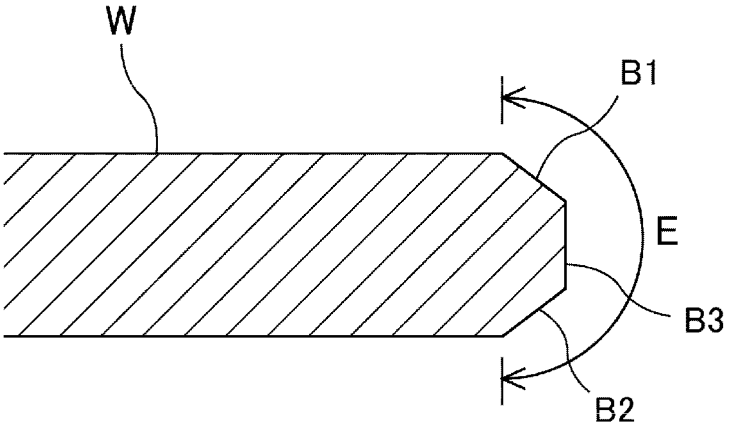
FIG. 1A is an enlarged cross-sectional view showing an edge portion of a substrate.
Figure 1B:
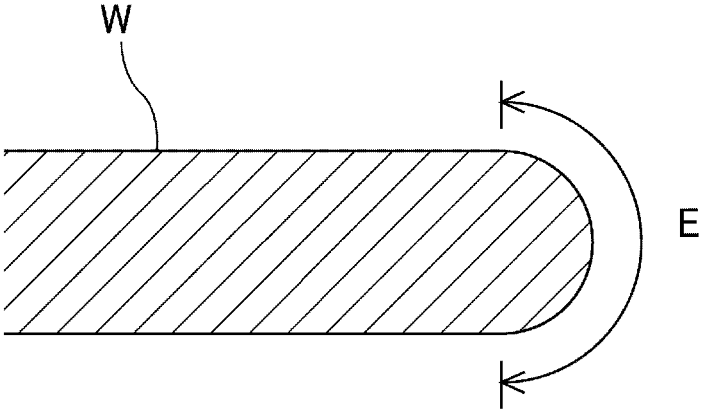
FIG. 1B is an enlarged cross-sectional view showing an edge portion of a substrate.

FIGS. 1A and 1B are enlarged cross-sectional views each showing an edge portion E of a substrate W. More specifically, FIG. 1A is a cross-sectional view of a substrate W of a so-called straight type, and FIG. 1B is a cross-sectional view of a substrate W of a so-called round type. The edge portion E is a portion constituting an outermost circumferential surface inclined with respect to a flat surface (a front surface and a back surface) of the substrate W and having a rounded shape or a beveled shape. In the substrate W in FIG. 1A, the edge portion E is an outermost circumferential surface including an upper slope portion (or upper bevel portion) B1, a lower slope portion (or lower bevel portion) B2, and a side portion (or apex) B3 of the substrate W. In the substrate W in FIG. 1B, the edge portion E is a portion constituting an outermost circumferential surface of the substrate W and having a curved cross section. The edge portion E may be also referred to as a bevel portion.

Figure 2:
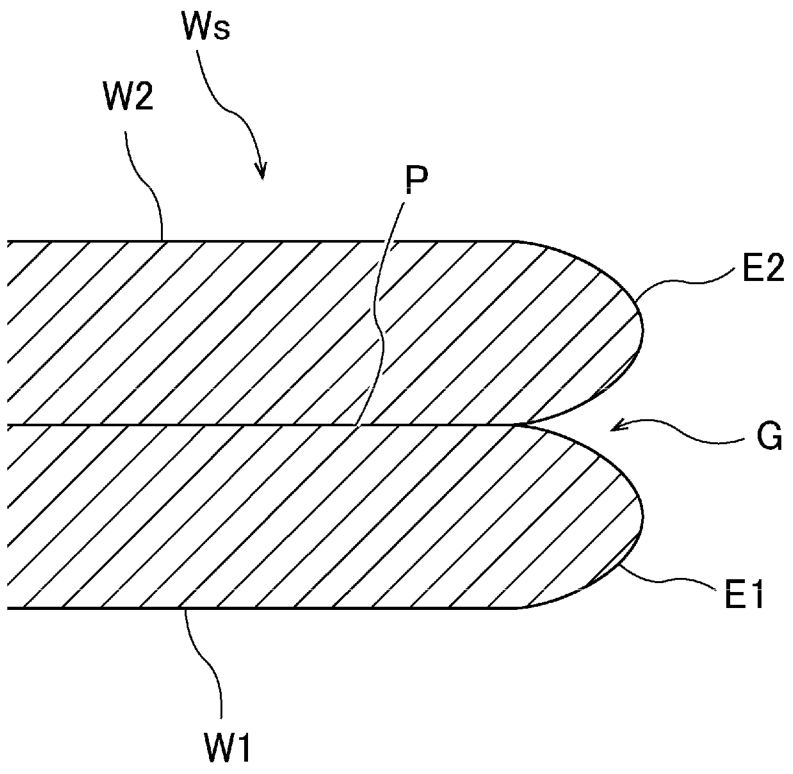
FIG. 2 is an enlarged cross-sectional view showing a laminated substrate.

FIG. 2 is an enlarged cross-sectional view showing a laminated substrate Ws. The laminated substrate Ws has a structure in which a first substrate W1 and a second substrate W2 are bonded at a bonding surface P. Each of the first substrate W1 and the second substrate W2 for use in this embodiment has a circular shape. The laminated substrate Ws of this embodiment has a structure in which a first substrate W1 and a second substrate W2 of the round type shown in FIG. 1B are bonded, while in one embodiment, the laminated substrate Ws may have a structure in which a first substrate W1 and a second substrate W2 of the straight type shown in FIG. 1A are bonded. In this specification, the edge portion of the laminated substrate Ws refers to an outer periphery of the laminated substrate Ws including the edge portion E1 of the first substrate W1 and the edge portion E2 of the second substrate W2. The edge portions E1 and E2 may be called bevel portions. A gap G is formed between the edge portion E1 of the first substrate W1 and the edge portion E2 of the second substrate W2. The gap G is formed around the entire circumference of the laminated substrate Ws.

Figure 3:
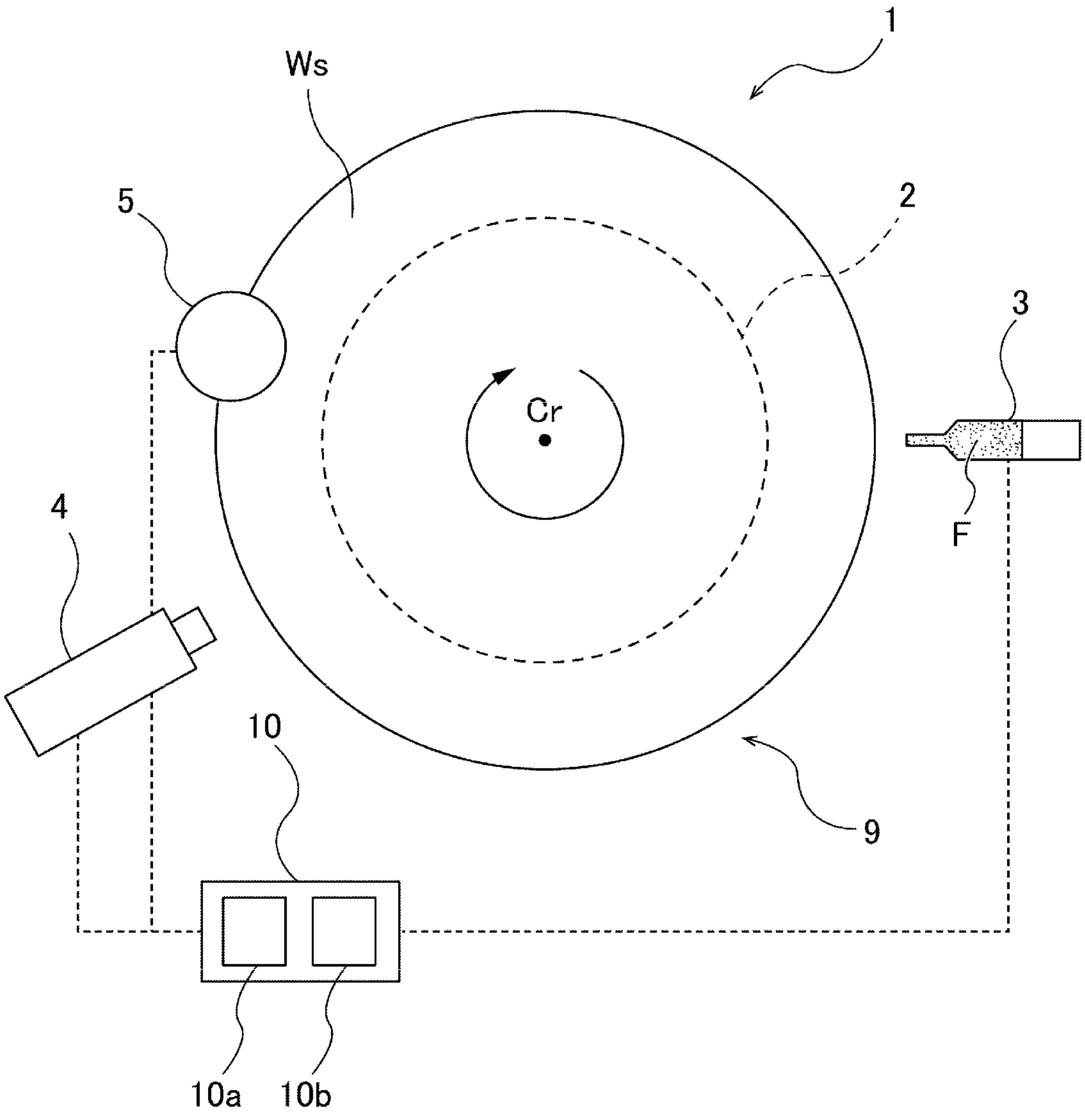
FIG. 3 is a plan view showing an embodiment of a substrate processing apparatus.
Figure 4:
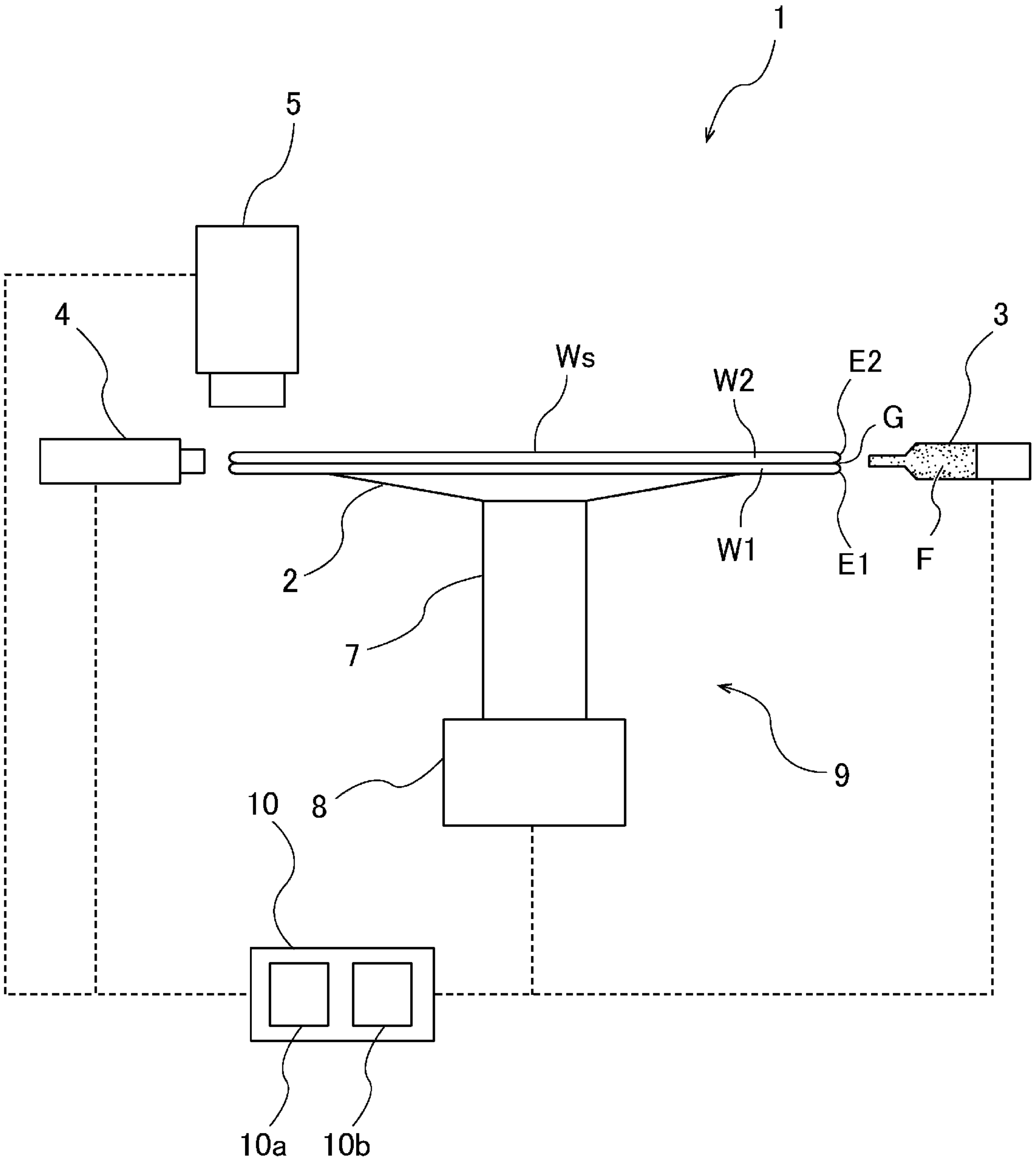
FIG. 4 is a side view showing an embodiment of the substrate processing apparatus.

FIG. 3 is a plan view showing an embodiment of a substrate processing apparatus 1, and FIG. 4 is a side view showing an embodiment of the substrate processing apparatus 1. The substrate processing apparatus 1 is an apparatus for applying a filler F to a laminated substrate Ws having a first substrate W1 and a second substrate W2 which have been bonded to each other. The substrate processing apparatus 1 includes a filler application module 9 configured to apply the filler F to the laminated substrate Ws, and an operation controller 10 configured to control operations of the filler application module 9. The filler application module 9 includes a substrate holder 2 configured to hold the laminated substrate Ws, an application device 3 configured to apply the filler F, a curing device 4 configured to cure the applied filler F, and an infrared imaging device 5 configured to generate an image of an edge portion of the laminated substrate Ws.

The substrate holder 2 includes a stage configured to hold a back surface of the laminated substrate Ws by vacuum suction. The filler application module 9 further includes a rotating shaft 7 coupled to a central portion of the substrate holder 2, and a rotating mechanism 8 configured to rotate the substrate holder 2 and the rotating shaft 7. The laminated substrate Ws is placed on the substrate holder 2 such that the center of the laminated substrate Ws is aligned with a central axis of the rotating shaft 7. The rotating mechanism 8 includes a motor (not shown). As shown in FIG. 3, the rotating mechanism 8 is configured to rotate the substrate holder 2 and the laminated substrate Ws together in a direction shown by an arrow about a central axis Cr of the laminated substrate Ws.

Figure 5:
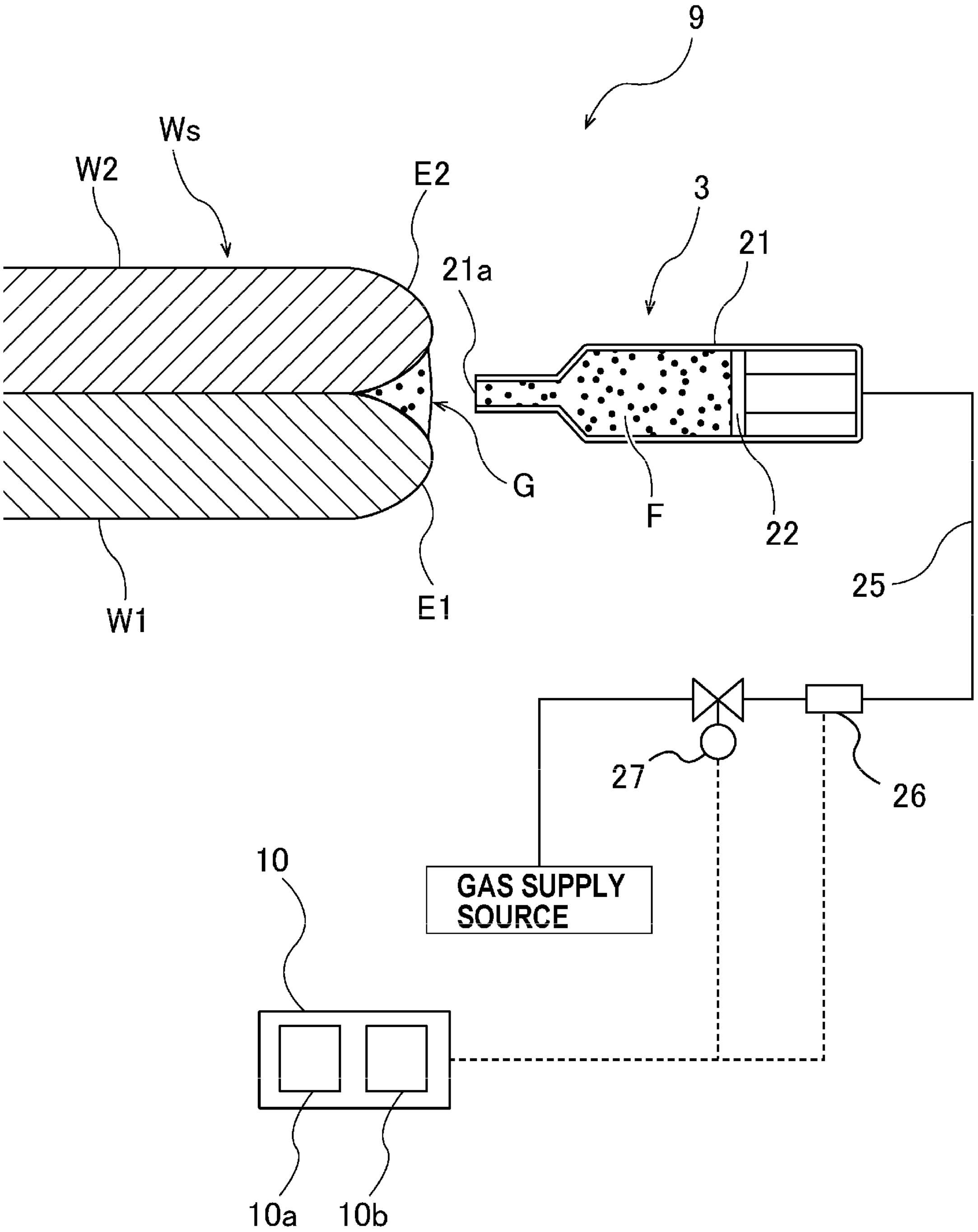
FIG. 5 is a schematic diagram showing an embodiment of an application device.

The application device 3 is located radially outwardly of the laminated substrate Ws placed on the substrate holder 2, and is configured to apply the filler F to the gap G between the edge portion E1 of the first substrate W1 and the edge portion E2 of the second substrate W2 of the laminated substrate Ws. FIG. 5 is a schematic diagram showing an embodiment of the application device 3. The application device 3 includes a syringe 21 for injecting the filler F, a piston 22 movable reciprocally in the syringe 21, and a horizontal moving mechanism (not shown) configured to move the syringe 21 toward and away from the laminated substrate Ws. This horizontal moving mechanism allows the application device 3 to adjust a distance between the laminated substrate Ws and a filler emitting port 21*a* of the application device 3. In one embodiment, the application device 3 may omit the horizontal moving mechanism. In this case, the distance between the laminated substrate Ws and the filler emitting port 21*a* is determined in advance such that the filler F is appropriately injected into the gap G of the laminated substrate Ws.

The syringe 21 has a hollow structure and is configured to be filled with the filler F therein. The piston 22 is arranged in the syringe 21. The syringe 21 has the filler emitting port 21*a* for emitting the filler F at its tip. The tip of the syringe 21 including the filler emitting port 21*a* may be configured to be detachable. A shape of the filler emitting port 21*a* is selected to be an appropriate shape depending on physical properties (e.g., viscosity, etc.) of the filler F to be applied. The filler emitting port 21*a* is arranged so as to face the gap G between the edge portion E1 of the first substrate W1 and the edge portion E2 of the second substrate W2.

The application device 3 is coupled to a gas supply source via a gas supply line 25. When gas (e.g., dry air or nitrogen gas) is supplied from the gas supply source into the syringe 21, the piston 22 moves forward in the syringe 21. The forward movement of the piston 22 causes the filler F in the syringe 21 to be emitted through the filler emitting port 21*a*.

A pressure regulator 26 and an on-off valve 27 are disposed in the gas supply line 25. The on-off valve 27 is an actuator-driven valve, such as an electric valve or a solenoid valve. When the on-off valve 27 is opened, the gas is supplied from the gas supply source to the application device 3, so that the application device 3 applies the filler F to the laminated substrate Ws. When the on-off valve 27 is closed, the supply of the gas to the application device 3 is stopped, so that the applying of the filler F is stopped. The pressure regulator 26 can regulate an amount of the filler F to be emitted from the filler emitting port 21*a* per unit time by regulating a pressure of the gas to be supplied from the gas supply source to the application device 3. Operations of the pressure regulator 26 and the on-off valve 27 are controlled by the operation controller 10.

In one embodiment, the application device 3 may include a screw feeder instead of the combination of the syringe 21 and the piston 22.

As shown in FIGS. 3 and 4, the curing device 4 is located radially outwardly of the laminated substrate Ws placed on the substrate holder 2. The curing device 4 is disposed downstream of the application device 3 in a rotating direction of the laminated substrate Ws, and is configured to cure the filler F that has been applied to the laminated substrate Ws by the application device 3. Curing of the filler F by the curing device 4 is performed while the laminated substrate Ws is rotated. In this embodiment, the filler F has thermosetting property. An example of such filler is a thermosetting resin.

The curing device 4 is an air heater, which is configured to emit hot air blowing toward the filler F applied to the laminated substrate Ws. The curing device 4 is configured to be able to regulate pressure and temperature of the hot air blowing toward the filler F. The filler F heated with the hot air is cured by a crosslinking reaction. When the filler F contains a solvent, the solvent is volatilized by being heated. The curing device 4 is not limited to the air heater, and may be a lamp heater or other configuration as long as the curing device 4 can heat and cure the filler F.

In this embodiment, the filler F has thermosetting property, while in one embodiment, the filler F may have ultraviolet curable property. In this case, the curing device 4 may be a UV irradiation device configured to cure the filler F by emitting ultraviolet ray. When the filler F contains a solvent, the curing device 4 may heat the filler F to volatilize the solvent with an air heater or the like, in addition to the UV irradiation device.

The infrared imaging device 5 is disposed downstream of the curing device 4 in the rotating direction of the laminated substrate Ws. The infrared imaging device 5 is configured to generate an image including the filler F applied to the laminated substrate Ws by the application device 3 and cured by the curing device 4. A distance between the infrared imaging device 5 and the curing device 4 is shorter than a distance between the infrared imaging device 5 and the application device 3. The infrared imaging device 5 is located above the edge portion of the laminated substrate Ws, and is configured to generate an image of the edge portion of the laminated substrate Ws. More specifically, the infrared imaging device 5 emits infrared light to the edge portion of the laminated substrate Ws, receives infrared light reflected from the edge portion of the laminated substrate Ws, and generates the image of the edge portion of the laminated substrate Ws. An example of the infrared imaging device 5 is an infrared microscope.

Figure 6:
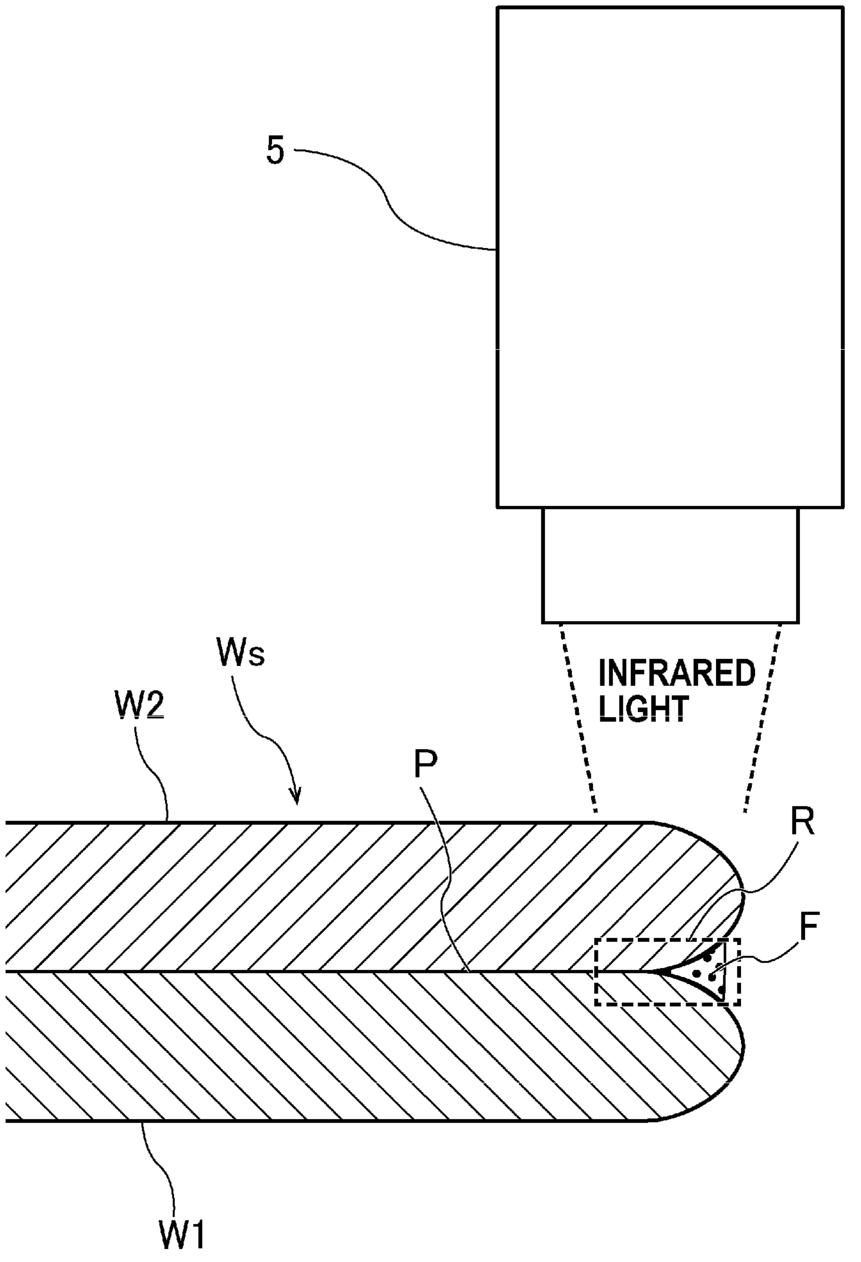
FIG. 6 is a schematic diagram showing a manner in which an infrared imaging device generates an image.

FIG. 6 is a schematic diagram showing a manner in which the infrared imaging device 5 generates an image. The infrared imaging device 5 emits the infrared light approximately perpendicularly to the bonding surface P of the first substrate W1 and the second substrate W2 of the laminated substrate Ws. The infrared imaging device 5 generates an image of an imaging region R including the filler F applied to the laminated substrate Ws by the application device 3 and cured by the curing device 4. Generating of the image by the infrared imaging device 5 may be performed while the laminated substrate Ws is rotated. The infrared light has a wavelength that passes through silicon. In this embodiment, the first substrate W1 and the second substrate W2 are basically made of silicon wafers, and the infrared light emitted from the infrared imaging device 5 is transmitted through the first substrate W1 and the second substrate W2. Since the infrared light does not pass through the filler F, the infrared imaging device 5 can generate the image of the imaging region R including the filler F from the infrared light reflected from the edge portion of the laminated substrate Ws.

The operation controller 10 is configured to control operations of the filler application module 9 configured as described above. The filler application module 9 including the application device 3, the curing device 4, the infrared imaging device 5, the rotating mechanism 8, the pressure regulator 26, and the on-off valve 27 is electrically coupled to the operation controller 10.

The operation controller 10 is composed of at least one computer. The operation controller 10 includes a memory 10*a* storing programs therein for controlling the operations of the filler application module 9, and a processor 10*b* configured to perform arithmetic operations according to instructions contained in the programs. The memory 10*a* includes a main memory, such as a random-access memory (RAM), and an auxiliary memory, such as a hard disk drive (HDD) or a solid state drive (SSD).

Examples of the processor 10*b* include a CPU (central processing unit) and a GPU (graphic processing unit). However, the specific configuration of the operation controller 10 is not limited to these examples.

Figure 7:
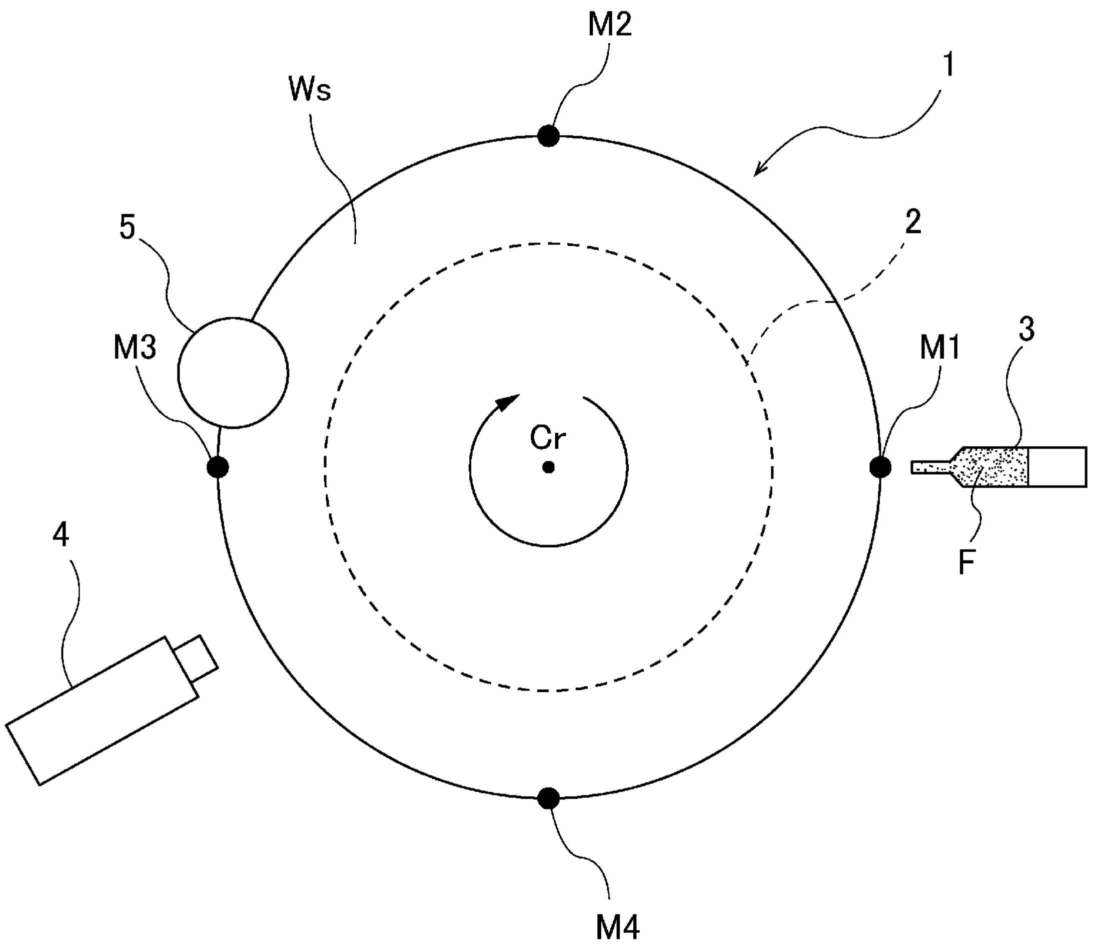
FIG. 7 is a diagram showing an example of measurement points set on a laminated substrate.

The infrared imaging device 5 generates the image of the edge portion of the laminated substrate Ws at a preset measurement point while the laminated substrate Ws makes one revolution. The number of measurement points may be one, or two or more. FIG. 7 is a diagram showing an example of measurement points set on the laminated substrate Ws. In this embodiment, the number of measurement points is four.

As shown in FIG. 7, the four measurement points M1 to M4 are located in the edge portion of the laminated substrate Ws at equal intervals around the central axis Cr of the laminated substrate Ws. The operation controller 10 has location information (e.g., angle information) on a starting point for application of the filler F and the measurement points M1 to M4. The laminated substrate Ws rotates in a direction shown by an arrow. When the starting point for application of the filler F is located at the measurement point M1, the application device 3 starts applying of the filler F from the measurement point M1, and then the filler F is continuously applied to the edge portion of the laminated substrate Ws. The filler F may be applied while the laminated substrate Ws rotates multiple times depending on a total amount of the filler F to be applied.

Similarly, the curing device 4 continuously cures the filler F applied to the edge portion of the laminated substrate Ws. Furthermore, the infrared imaging device 5 generates images of the edge portion of the laminated substrate Ws at the measurement points in an order of the measurement points M1, M2, M3, and M4. The operation controller 10 determines the filling state of the filler F applied to the gap G (see FIG. 5) between the edge portion E1 of the first substrate W1 and the edge portion E2 of the second substrate W2 based on the generated images. The operation controller 10 instructs the application device 3 to terminate the application of the filler F at an appropriate timing based on the determined filling state of the filler F.

Figure 8A:
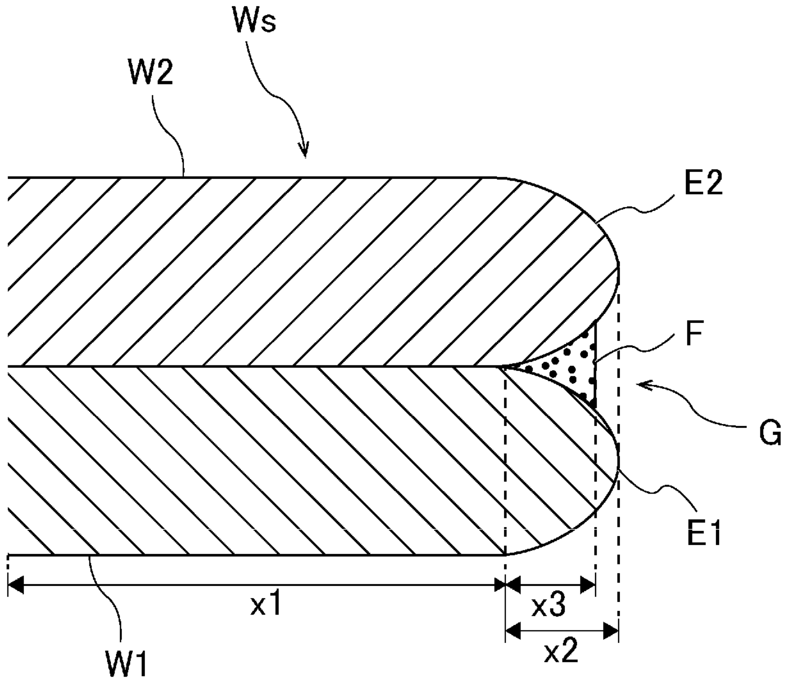
FIG. 8A is an enlarged cross-sectional view of an edge portion of the laminated substrate during filling of a filler.
Figure 8B:
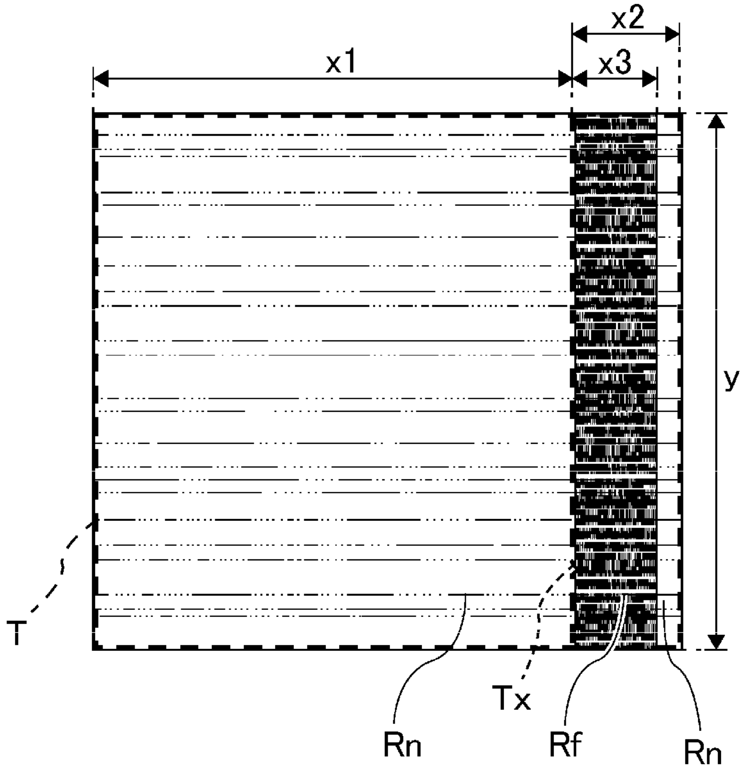
FIG. 8B is a diagram showing an image of the edge portion of the laminated substrate shown in FIG. 8A.

Next, a method of determining the filling state of the filler F will be described. FIG. 8A is an enlarged cross-sectional view of the edge portion of the laminated substrate during filling of the filler F. FIG. 8B is a diagram showing an image of the edge portion of the laminated substrate Ws shown in FIG. 8A. The edge portion of the laminated substrate Ws shown in FIG. 8A corresponds to the imaging region R shown in FIG. 6. FIG. 8B shows the image of the imaging region R generated by the infrared imaging device 5 disposed above the edge portion of the laminated substrate Ws. In this embodiment, the image generated by the infrared imaging device 5 is a two-dimensional image, while in one embodiment, the image generated by the infrared imaging device 5 may be a three-dimensional image.

In FIG. 8A, a width x1 is a radial width of a portion where the first substrate W1 and the second substrate W2 are bonded in the imaging region R. A width x2 is a radial width of the gap G between the edge portion E1 of the first substrate W1 and the edge portion E2 of the second substrate W2. A width x3 is a radial width of the filler F applied to the gap G.

The widths x1 to x3 shown in FIG. 8B correspond to the widths x1 to x3 shown in FIG. 8A. Regions Rn corresponding to portions where the filler F is not present appear on the image with a color close to white, because the infrared light emitted from the infrared imaging device 5 passes through the second substrate W2 and the first substrate W1. A region Rf corresponding to a portion where the filler F is present appears on the image with a color close to black, because the infrared light emitted from the infrared imaging device 5 passes through the second substrate W2 and is reflected from the filler F.

The operation controller 10 determines the filling state of the filler F applied to the gap G between the edge portion E1 of the first substrate W1 and the edge portion E2 of the second substrate W2 based on the image generated by the infrared imaging device 5. More specifically, the operation controller 10 determines the filling state based on a size of the filler F in a preset target region T on the image. The target region T may be a part of the image or the entire image. As shown in FIG. 8B, the target region T of this embodiment is a region having a width of x1+x2 in the radial direction and a length of y in a direction perpendicular to the radial direction. In one embodiment, the target region T may be set to a region (indicated by a reference symbol Tx) having the width of x2 in the radial direction and the length of y in the direction perpendicular to the radial direction. The target region T is not limited as long as the entirety of the filler F is present in the radial width of the target region T.

In the laminated substrate Ws shown in FIG. 8A, the filler F has been applied to the laminated substrate Ws with the width x3 of the filler F in the radial direction. The filling of the filler F is completed when the filler F is applied until the width of the filler F in the radial direction reaches x2. Therefore, the filling state of the filler F of this embodiment is “filling is not yet completed”. When the size of the filler F in the target region T (i.e., an area of the region Rf) is smaller than a predetermined threshold value, the operation controller 10 determines that the filling state is “filling is not yet completed". In this embodiment, the predetermined threshold value is set to the size of the filler F in the target region T when the width of the filler F in the radial direction is x2 (i.e., the area of the region Rf when the width of the filler F in the radial direction is x2).

Figure 9A:
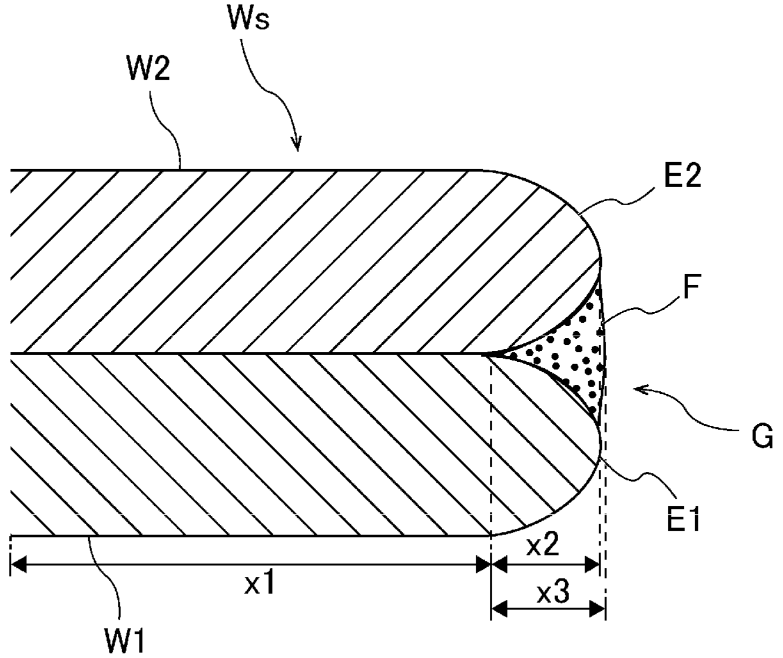
FIG. 9A is an enlarged cross-sectional view of the edge portion of the laminated substrate after filling of the filler is completed.
Figure 9B:
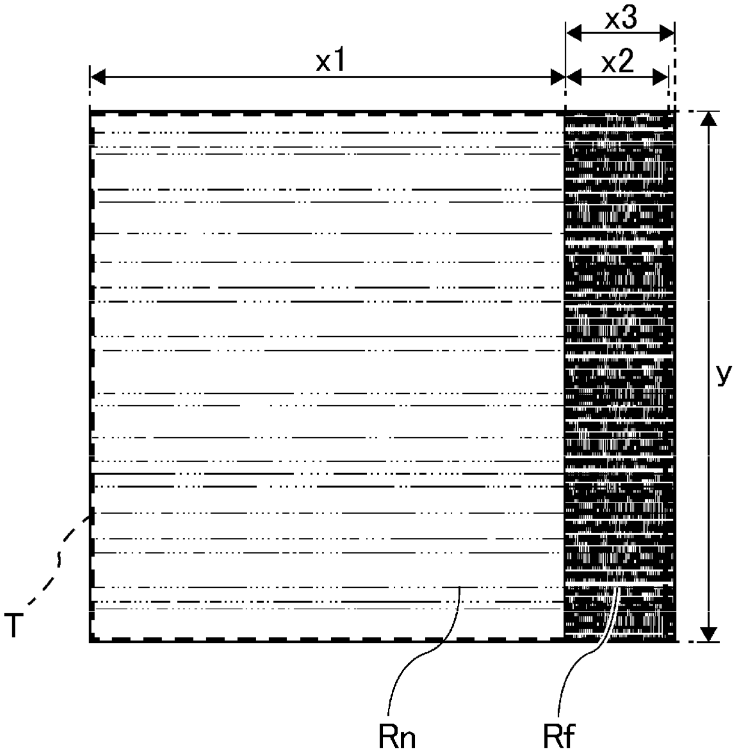
FIG. 9B is a diagram showing an image of the edge portion of the laminated substrate shown in FIG. 9A.

FIG. 9A is an enlarged cross-sectional view of the edge portion of the laminated substrate Ws after filling of the filler F is completed. FIG. 9B is a diagram showing an image of the edge portion of the laminated substrate Ws shown in FIG. 9A. Details of this embodiment, which will be not particularly described, are the same as those of the embodiment described with reference to FIGS. 8A and 8B, and duplicated descriptions will be omitted. In FIG. 9A, a width x1 is a radial width of the portion where the first substrate W1 and the second substrate W2 are bonded in the imaging region R. A width x2 is a radial width of the gap G between the edge portion E1 of the first substrate W1 and the edge portion E2 of the second substrate W2. A width x3 is a radial width of the filler F applied to the gap G.

The widths x1 to x3 shown in FIG. 9B correspond to the widths x1 to x3 shown in FIG. 9A. A region Rn corresponding to a portion where the filler F is not present appears on the image with a color close to white, because the infrared light emitted from the infrared imaging device 5 passes through the second substrate W2 and the first substrate W1. A region Rf corresponding to a portion where the filler F is present appears on the image with a color close to black, because the infrared light emitted from the infrared imaging device 5 passes through the second substrate W2 and is reflected from the filler F.

The operation controller 10 determines the filling state of the filler F applied to the gap between the edge portion E1 of the first substrate W1 and the edge portion E2 of the second substrate W2 based on the image generated by the infrared imaging device 5. More specifically, the operation controller 10 determines the filling state based on the size of the filler F in the target region T on the image.

In the laminated substrate Ws shown in FIG. 9A, the filler F has been applied to the laminated substrate Ws with the width x3 of the filler F in the radial direction. The filling of the filler F is completed when the filler F is applied until the width of the filler F in the radial direction reaches x2. Therefore, the filling state of the filler F of this embodiment is "filling has been completed". When the size of the filler F in the target region T (i.e., an area of the region Rf) is equal to or larger than a predetermined threshold value, the operation controller 10 determines that the filling state is "filling has been completed". In this embodiment, the predetermined threshold value is set to the size of the filler F in the target region T when the width of the filler F in the radial direction is x2 (i.e., the area of the region Rf when the width of the filler F in the radial direction is x2).

The operation controller 10 instructs the application device 3 to terminate the application of the filler F based on the determined filling state of the filler F. More specifically, when the operation controller 10 determines that the filling state of the filler F is "filling is not yet completed", the operation controller 10 instructs the filler application module 9 to continue the application of the filler F by the application device 3. When the operation controller 10 determines that the filling state of the filler F is "filling has been completed", the operation controller 10 instructs the filler application module 9 to terminate the application of the filler F by the application device 3.

Figure 10:
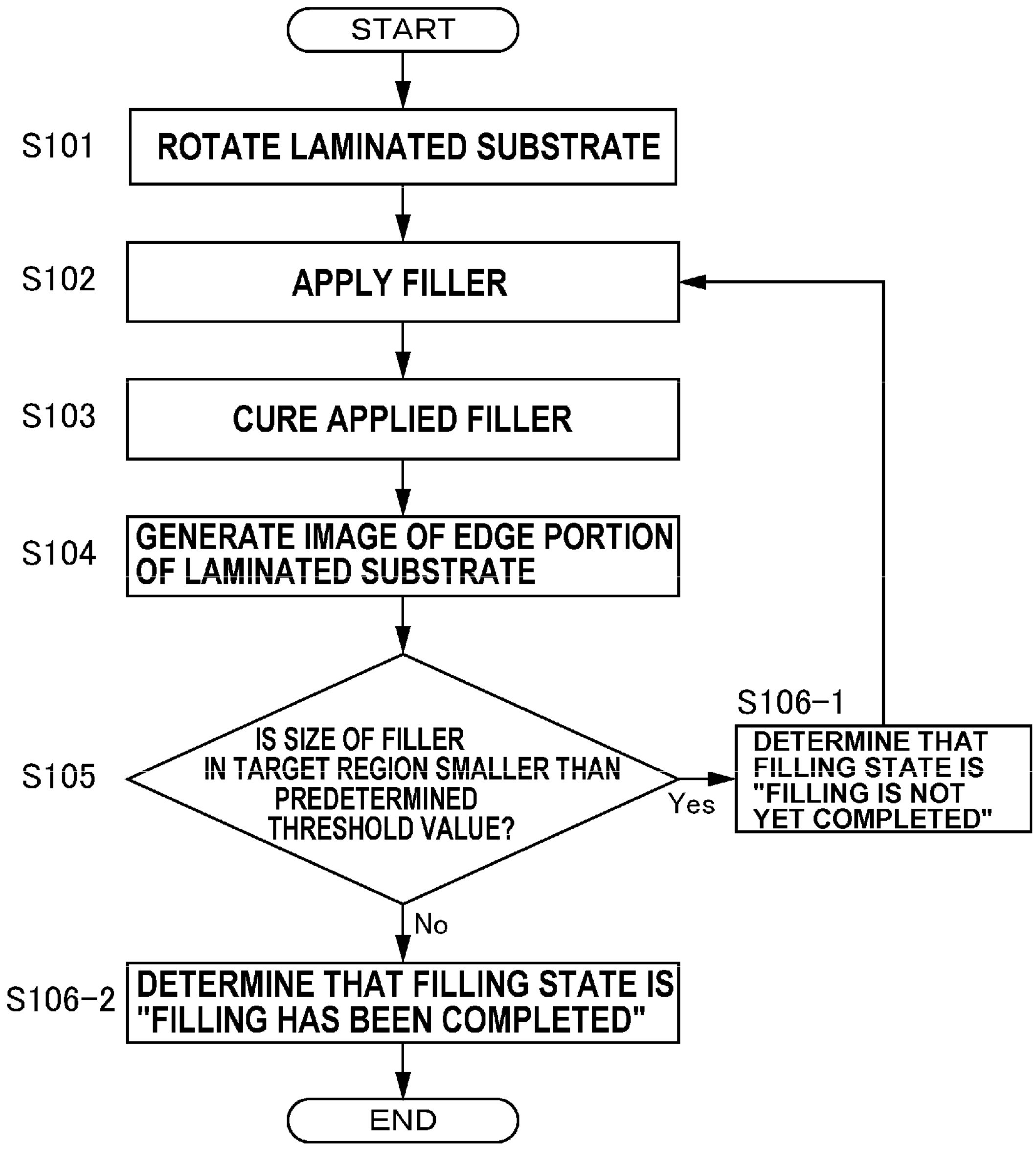
FIG. 10 is a flowchart showing an embodiment of a substrate processing method.

FIG. 10 is a flowchart showing an embodiment of a substrate processing method.

In step S101, the operation controller 10 instructs the rotating mechanism 8 of the filler application module 9 to rotate the substrate holder 2 and the laminated substrate Ws at a predetermined rotation speed.

In step S102, the operation controller 10 instructs the on-off valve 27 of the filler application module 9 to open the on-off valve 27 to cause the gas to be supplied from the gas supply source to the application device 3. With this operation, the filler F is injected into the gap G between the edge portion E1 of the first substrate W1 and the edge portion E2 of the second substrate W2 of the rotating laminated substrate Ws.

In step S103, the operation controller 10 instructs the curing device 4 of the filler application module 9 to heat the laminated substrate Ws to cure the applied filler F.

In step S104, the operation controller 10 instructs the infrared imaging device 5 of the filler application module 9 to generate an image of the edge portion of the laminated substrate Ws at measurement point(s) on the laminated substrate Ws.

In step S105, the operation controller 10 compares a size of the filler F in the target region T on the image generated by the infrared imaging device 5 with a predetermined threshold value.

When the size of the filler F in the target T is smaller than the predetermined threshold value, the operation controller 10 determines that the filling state is "filling is not yet completed" (step S106-1). When the operation controller 10 determines that the filling state is "filling is not yet completed", the operation controller 10 instructs the filler application module 9 to continue the application of the filler F by the application device 3, and repeats the steps S102 to S105.

When the size of the filler F in the target T is equal to or larger than the predetermined threshold value, the operation controller 10 determines that the filling state is "filling has been completed" (step S106-2). When the operation controller 10 determines that the filling state is "filling has been completed", the operation controller 10 instructs the filler application module 9 to terminate the application of the filler F. When the starting point for application of the filler F reaches an applying position of the application device 3, the operation controller 10 may instruct the filler application module 9 to stop the application of the filler F.

According to this embodiment, since the distance between the infrared imaging device 5 and the curing device 4 is shorter than the distance between the infrared imaging device 5 and the application device 3, the determination of the filling state of the filler F is performed immediately after the curing of the filler F by the curing device 4. Therefore, the filling state of the filler F can be monitored in real time, and the application of the filler F can be terminated at an appropriate timing. As a result, appropriate filling of the filler F can be achieved.

In one embodiment, the operation controller 10 may compare the size of the filler F in the target region T with the predetermined threshold value to determine the filling state after the operations of the application device 3 and the curing device 4 are stopped (step S105). In this case, when the filling state is determined to be "filling is not yet completed" (step S106-1), the operation controller 10 may instruct the filler application module 9 to start the operations of the application device 3 and the curing device 4 again to additionally apply the filler F by the application device 3 (step S102), and may repeat the steps S103 to S105.

In one embodiment, the additional application of the filler F may be performed only to a part of the edge portion of the laminated substrate Ws based at filling states of the filler F at measurement points and location information on the measurement points. For example, the operation controller 10 may determine filling states of the filler F at the measurement points M1 to M4 shown in FIG. 7. When the operation controller 10 determines that the filling state at the measurement point M1 is "filling is not yet completed" and that the filling states at the measurement points M2 to M4 are "filling has been completed", the operation controller 10 may instruct the filler application module 9 to perform additional application of the filler F only to the measurement point M1.

Figure 11A:
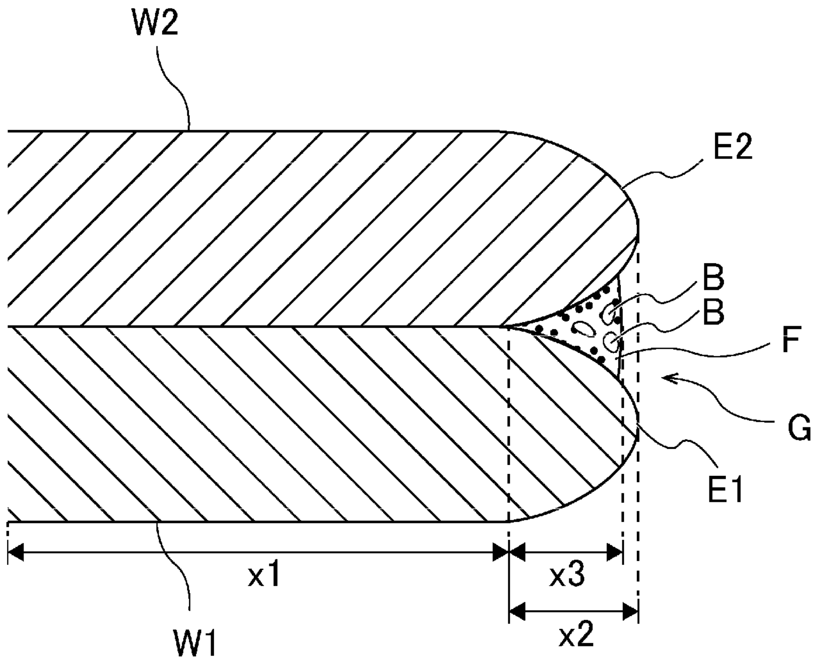
FIG. 11A is an enlarged cross-sectional view of the edge portion of the laminated substrate with voids in the filler.
Figure 11B:
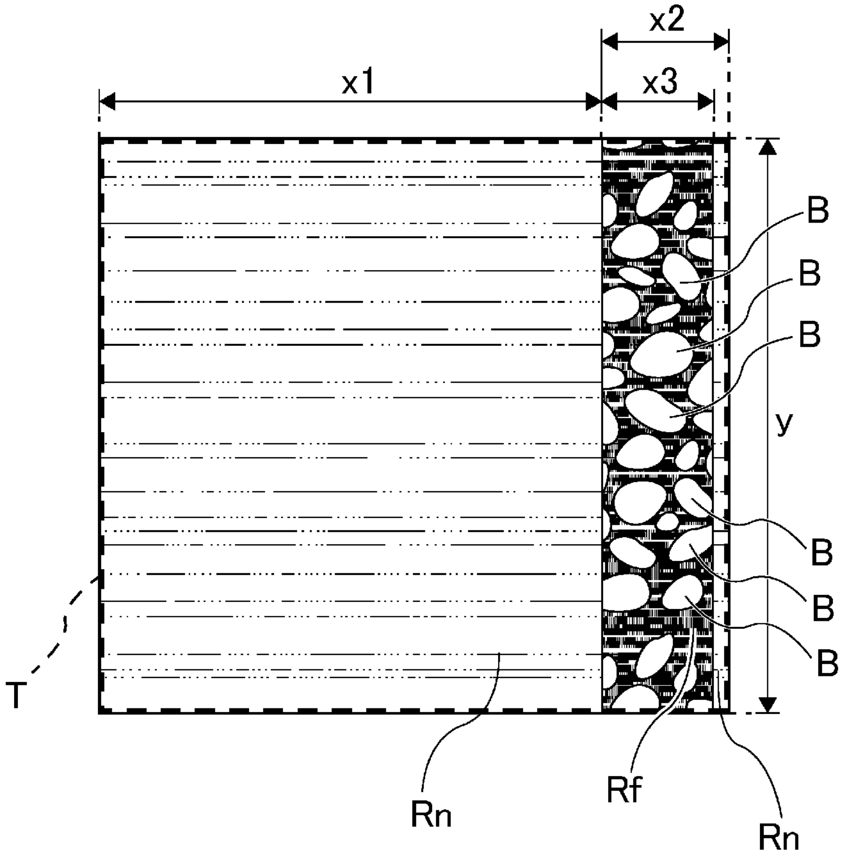
FIG. 11B is a diagram showing an image of the edge portion of the laminated substrate shown in FIG. 11A.

Next, another embodiment of the substrate processing method will be described. FIG. 11A is an enlarged cross-sectional view of the edge portion of the laminated substrate Ws with voids B in the filler F. The voids B are pores formed in the filler F that has been applied to the laminated substrate Ws. FIG. 11B is a diagram showing an image of the edge portion of the laminated substrate Ws shown in FIG. 11A. Details of this embodiment, which will be not particularly described, are the same as those of the embodiment described with reference to FIGS. 8A and 8B, and duplicated descriptions will be omitted. The voids B may be generated in the applied filler F depending on an applying condition for the filler F. In FIG. 11A, a width x1 is a radial width of the portion where the first substrate W1 and the second substrate W2 are bonded in the imaging region R. A width x2 is a radial width of the gap G between the edge portion E1 of the first substrate W1 and the edge portion E2 of the second substrate W2. A width x3 is a radial width of the filler F applied to the gap G.

The widths x1 to x3 shown in FIG. 11B correspond to the widths x1 to x3 shown in FIG. 11A. Regions Rn corresponding to portions where the filler F is not present appear on the image with a color close to white, because the infrared light emitted from the infrared imaging device 5 passes through the second substrate W2 and the first substrate W1. A region Rf corresponding to a portion where the filler F is present appears on the image with a color close to black, because the infrared light emitted from the infrared imaging device 5 passes through the second substrate W2 and is reflected from the filler F. The voids B generated in the filler F appear on the image with a color close to white.

Figure 12:
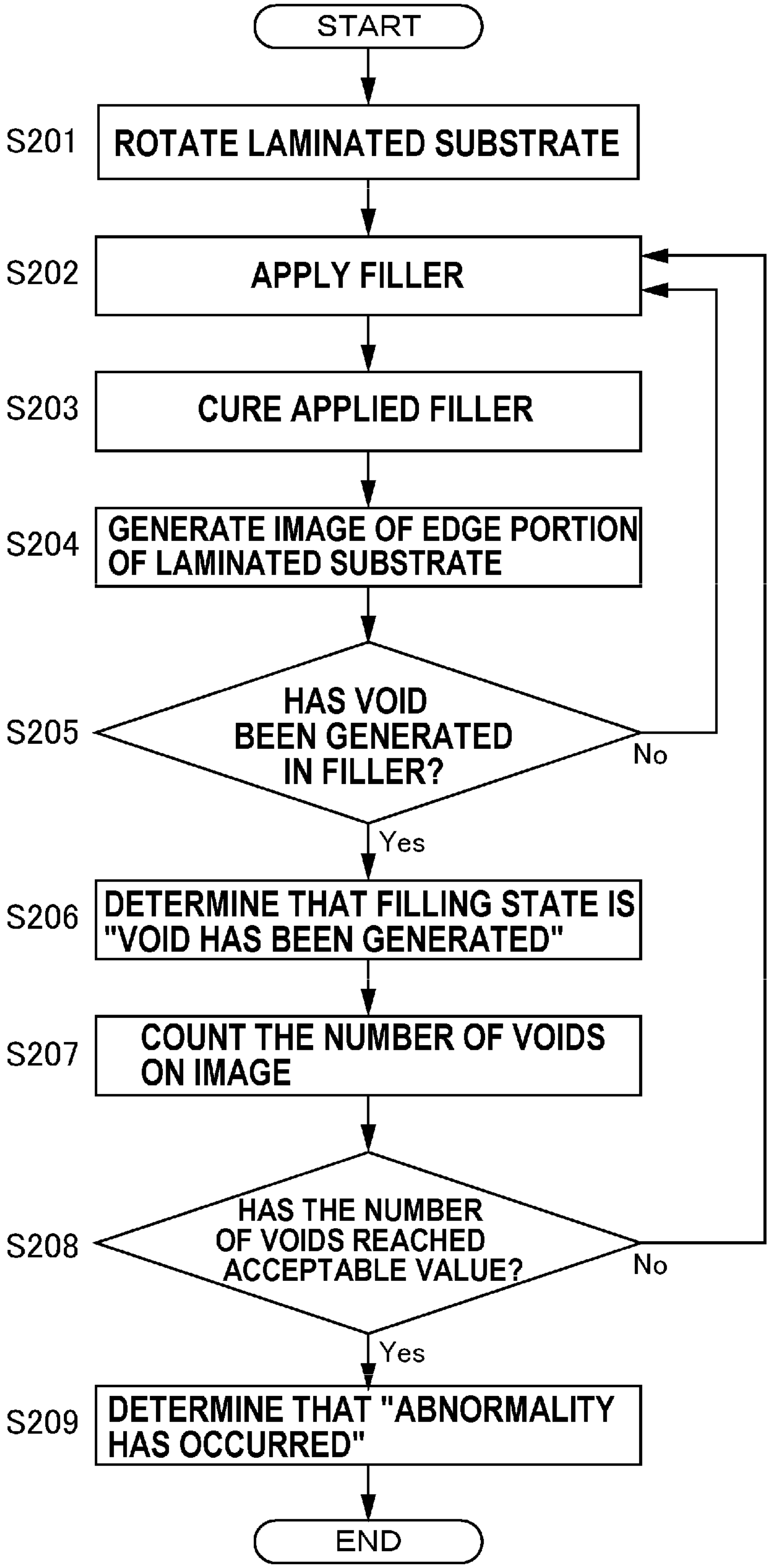
FIG. 12 is a flowchart showing another embodiment of the substrate processing method.

The operation controller 10 determines the filling state of the filler F applied to the gap G between the edge portion E1 of the first substrate W1 and the edge portion E2 of the second substrate W2 based on the image generated by the infrared imaging device 5. More specifically, when the operation controller 10 detects a void B in the filler F (i.e., the region Rf) in the image, the operation controller 10 determines that the filling state is "void has been generated". Furthermore, the operation controller 10 counts the number of voids B on the image, and when the number of voids B has reached a preset acceptable value, the operation controller 10 determines that "abnormality has occurred". FIG. 12 is a flowchart showing another embodiment of the substrate processing method. Steps S201 to S204 of this embodiment are the same as the steps S101 to S104 of the embodiment described with reference to FIG. 10, and duplicated descriptions will be omitted.

In step S205, the operation controller 10 determines whether a void B has been generated in the filler F based on the image generated by the infrared imaging device 5.

When the void B has been generated in the filler F, the operation controller 10 determines that the filling state is "void has been generated" (step S206). When the operation controller 10 determines that the void B is not generated in the filler F ("No" in the step 205), the operation controller 10 instructs the filler application module 9 to continue the application of the filler F, and repeats the steps S202 to S205.

When the void B has been generated in the filler F ("Yes" in the step 205), the operation controller 10 counts the number of voids B on the image generated by the infrared imaging device 5 (step S207).

In step S208, the operation controller 10 determines whether the number of voids B has reached a predetermined acceptable value. When the number of voids B has reached the acceptable value, the operation controller 10 determines that "abnormality has occurred" (step S209). When the operation controller 10 determines that "abnormality has occurred", the operation controller 10 instructs the filler application module 9 to terminate the application of the filler F.

When the number of voids B has not reached the predetermined acceptable value ("No" in the step S208), the operation controller 10 instructs the filler application module 9 to continue the application of the filler F, and repeats the steps S202 to S205.

According to this embodiment, since the distance between the infrared imaging device 5 and the curing device 4 is shorter than the distance between the infrared imaging device 5 and the application device 3, the determination of the filling state of the filler F is performed immediately after the curing of the filler F by the curing device 4. Therefore, the filling state of the filler F can be monitored in real time, so that an abnormality can be quickly detected.

In one embodiment, the operation controller 10 may detect a void B in the filler F based on a rate of increase in the size of the filler F in the target region T (see FIG. 11B) on the image. The rate of increase in the size of the filler F is an amount of increase in the size of the filler F per unit time in the target region T. If a void B is generated in the filler F, the radial width x3 (see FIGS. 11A and 11B) of the filler F applied to the gap G becomes larger than that when no voids B are generated. Thus, in this embodiment, the operation controller 10 determines that the filling state is "void has been generated" when the rate of increase in the size of the filler F in the target region T (i.e., the rate of increase in the area of the region Rf) is larger than a predetermined reference value. The predetermined reference value may be set, for example, based on a rate of increase in the size of the filler F when no voids B are generated in the filler F, which is obtained in advance through an experiment or the like.

The rate of increase in the size of the filler F can be determined from the size of the filler F in the target region T on the image generated by the infrared imaging device 5 each time the laminated substrate Ws makes one revolution. For example, the operation controller 10 calculates an amount of increase in the size of the filler F from a size of the filler F in the target region T on an image when the laminated substrate Ws makes one revolution from the start of application of the filler F, and a size of the filler F in the target region T on an image when the laminated substrate Ws further makes one revolution. The operation controller 10 calculates the amount of increase in the size of the filler F per unit time, i.e., the rate of increase in the size of the filler F, by dividing the calculated amount of increase in the size of the filler F by a time for the laminated substrate to make one revolution.

Furthermore, when the rate of increase in the size of the filler F in the target region T is larger than the reference value, the operation controller 10 may instruct the filler application module 9 to terminate the application of the filler F.

If many voids are generated in the filler F, a volume of the applied filler F may be larger than expected. Thus, in one embodiment, when the size of the filler F in the target region T (i.e., the area of the region Rf) is larger than a preset upper limit, the operation controller 10 may determine that the filling state is "void has been generated". Furthermore, when the size of the filler F in the target region T (i.e., the area of the region Rf) is larger than the preset upper limit, the operation controller 10 may instruct the filler application module 9 to terminate the application of the filler F.

In one embodiment, the operation controller 10 may change an applying condition for the filler F based on the filling state of the filler F. The applying condition includes at least one of a total amount of the filler F to be applied, a shape of the filler emitting port 21*a* (see FIG. 5) of the application device 3, a distance between the laminated substrate Ws and the filler emitting port 21*a*, an amount of the filler F to be emitted from the filler emitting port 21*a* per unit time, and a rotation speed of the laminated substrate Ws. In one embodiment, the applying condition may further include wind pressure and temperature of the hot air to be emitted from the curing device 4.

In one embodiment, the changing of the applying condition may be performed only at a part of the edge portion of the laminated substrate Ws based on filling states of the filler F at measurement points and location information on the measurement points. The operation controller 10 determines the filling states of the filler F at the measurement points M1 to M4 shown in FIG. 7. When the operation controller 10 determines that the filling state at the measurement point M1 is "filling failure" and that the filling states at the measurement points M2 to M4 are "filling is not yet completed", the operation controller 10 may change only an applying condition for the filler F at the measurement point M1 based on the location information on the measurement points M1 to M4.

According to this embodiment, since the distance between the infrared imaging device 5 and the curing device 4 is shorter than the distance between the infrared imaging device 5 and the application device 3, the determination of the filling state of the filler F is performed immediately after the curing of the filler F by the curing device 4. Therefore, the filling state of the filler F can be monitored in real time, so that the applying condition can be adjusted to achieve an optimal filling state.

In one embodiment, the filling state of the filler F applied to the laminated substrate Ws may be reflected in an applying condition for the filler F in a next laminated substrate. As a result, when the next laminated substrate has the same configuration as that of the laminated substrate Ws, the filler F can be applied appropriately without adjusting the applying condition during application of the filler F.

Figure 13A:
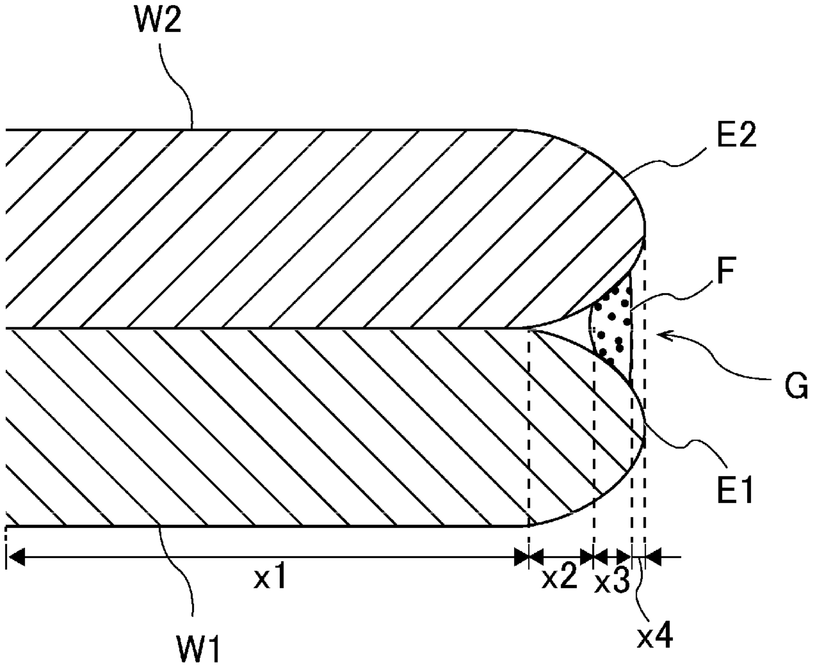
FIG. 13A is an enlarged cross-sectional view of the edge portion of the laminated substrate with a filling failure of the filler.
Figure 13B:
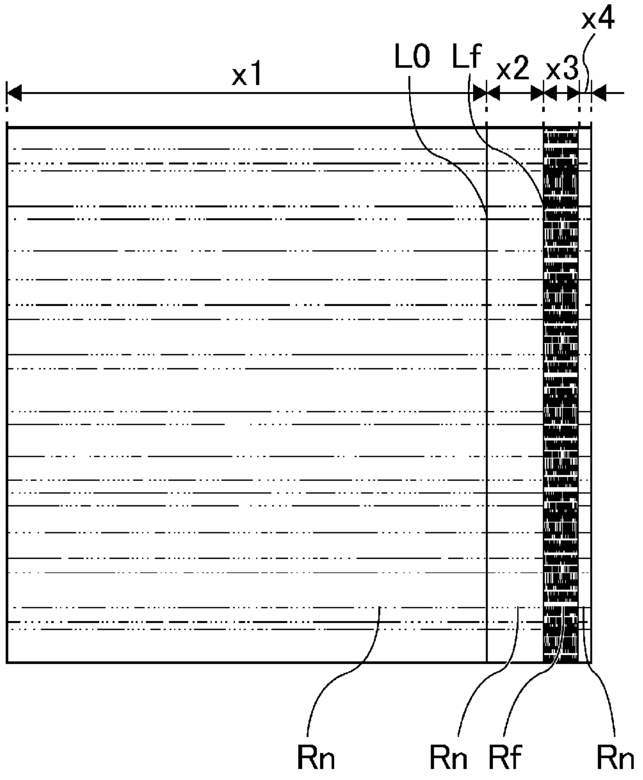
FIG. 13B is a diagram showing an image of the edge portion of the laminated substrate shown in FIG. 13A.

Next, still another embodiment of the substrate processing method will be described. FIG. 13A is an enlarged cross-sectional view of the edge portion of the laminated substrate Ws with a filling failure of the filler F. FIG. 13B is a diagram showing an image of the edge portion of the laminated substrate Ws shown in FIG. 13A. Details of this embodiment, which will be not particularly described, are the same as those of the embodiment described with reference to FIGS. 8A and 8B, and duplicated descriptions will be omitted. In FIG. 13A, a width x1 is a radial width of the portion where the first substrate W1 and the second substrate W2 are bonded in the imaging region R. A width x2 is a radial width of a portion to which the filler F is not applied in a region located radially inwardly of the filler F. A width x3 is a radial width of the filler F applied to the gap G. A width x4 is a radial width of a portion to which the filler F is not applied in a region located radially outwardly of the filler F, i.e., a width from a radially-outermost end of the filler F to a radially-outermost end of the laminated substrate Ws.

The widths x1 to x4 shown in FIG. 13B correspond to the widths x1 to x4 shown in FIG. 13A. Regions Rn where the filler F is not present appear on the image with a color close to white, because the infrared light emitted from the infrared imaging device 5 passes through the second substrate W2 and the first substrate W1. A region Rf where the filler F is present appears on the image with a color close to black, because the infrared light emitted from the infrared imaging device 5 passes through the second substrate W2 and is reflected from the filler F.

The operation controller 10 determines the filling state of the filler F applied to the gap G between the edge portion E1 of the first substrate W1 and the edge portion E2 of the second substrate W2 based on the image generated by the infrared imaging device 5. More specifically, the operation controller 10 determines the filling state based on a position of the filler F on the image.

The laminated substrate Ws shown in FIG. 13A has a filling failure of the filler F, and the filler F is not applied to the portion having the width x2 in the radial direction. In this case, as shown in FIG. 13B, a radially-innermost end position Lf of the region Rf is located radially outwardly of a radially-innermost end position L0 of the gap G between the edge portion E1 of the first substrate W1 and the edge portion E2 of the second substrate W2. When a the radially-innermost end position of the filler F (i.e., the radially-innermost end position Lf of the region Rf) is located radially outwardly of the radially-innermost end position L0 of the gap G, the operation controller 10 determines that the filling state is "filling failure". When the operation controller 10 determines that the filling state of the filler F is "filling failure", the operation controller 10 instructs the application device 3 to terminate the application of the filler F.

According to this embodiment, since the distance between the infrared imaging device 5 and the curing device 4 is shorter than the distance between the infrared imaging device 5 and the application device 3, the determination of the filling state of the filler F is performed immediately after the curing of the filler F by the curing device 4. Therefore, the filling state of the filler F can be monitored in real time, so that a filling failure can be quickly detected.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments.

Therefore, the present invention is not intended to be limited to the embodiments described herein but is to be accorded the widest scope as defined by limitation of the claims.

INDUSTRIAL APPLICABILITY

The present invention is applicable to a substrate processing method and a substrate processing apparatus for suppressing cracking and chipping of a laminated substrate manufactured by bonding substrates, and more particularly to a technique of applying a filler to a gap formed between edge portions of the substrates constituting the laminated substrate.

REFERENCE SIGNS LIST

1 substrate processing apparatus
2 substrate holder
3 application device
4 curing device
5 infrared imaging device
7 rotating shaft
8 rotating mechanism
9 filler application module
10 operation controller
10*a* memory
10*b* processor
21 syringe
21*a* filler ejecting port
22 piston
25 gas supply line
26 pressure regulator
27 on-off valve

What is claimed is:

1. A substrate processing method of applying a filler to a laminated substrate having a first substrate and a second substrate bonded to each other, comprising:

applying, by an application device, the filler to a gap between an edge portion of the first substrate and an edge portion of the second substrate, the application device being configured to inject the filler into the gap to thereby apply the filler to the gap;

curing the applied filler by a curing device;

generating, by an infrared imaging device, an image of an edge portion of the laminated substrate to which the filler is applied, the infrared imaging device being configured to emit infrared light to the edge portion of the laminated substrate, receive infrared light reflected from the edge portion of the laminated substrate, and generate the image of the edge portion of the laminated substrate; and determining a filling state of the filler applied to the gap and cured based on the image.

2. The substrate processing method according to claim 1, wherein determining the filling state comprises determining the filling state based on a size of the filler in a preset target region on the image.

3. The substrate processing method according to claim 1, wherein applying of the filler is terminated based on the filling state.

4. The substrate processing method according to claim 1, further comprising additionally applying the filler based on the filling state.

5. The substrate processing method according to claim 1, further comprising counting a number of voids generated in the filler on the image, and determining that an abnormality has occurred when the number of voids has reached a predetermined value.

6. The substrate processing method according to claim 1, wherein applying of the filler, curing of the filler, and generating of the image is performed while rotating the laminated substrate.

7. The substrate processing method according to claim 6, wherein an applying condition for the filler is changed based on the filling state.

8. The substrate processing method according to claim 7, wherein the image is generated at each of multiple measurement points of the laminated substrate while the laminated substrate makes one revolution, and an applying condition for the filler in at least one of the multiple measurement points is changed based on the filling state at each of the multiple measurement points and location information on the measurement points.

9. The substrate processing method according to claim 7, wherein the applying condition includes at least one of a total amount of the filler to be applied, a shape of a filler emitting port of an application device configured to apply the filler, a distance between the laminated substrate and the filler emitting port, an amount of the filler to be emitted from the filler emitting port per unit time, and a rotation speed of the laminated substrate.

10. The substrate processing method according to claim 1, further comprising changing an applying condition for the filler in a next laminated substrate based on the filling state.

11. The substrate processing method according to claim 1, wherein the infrared imaging device is configured to emit infrared light approximately perpendicularly to a bonding surface of the first substrate and the second substrate of the laminated substrate.

12. The substrate processing method according to claim 1, wherein the curing device is disposed downstream of the application device in a rotating direction of the laminated substrate, and the infrared imaging device is disposed downstream of the curing device in the rotating direction of the laminated substrate.

13. A substrate processing apparatus for applying a filler to a laminated substrate having a first substrate and a second substrate bonded to each other, comprising:

a filler application module configured to apply the filler to the laminated substrate; and an operation controller configured to control an operation of the filler application module, wherein the filler application module includes:

a substrate holder configured to hold the laminated substrate;

an application device configured to inject the filler into a gap between an edge portion of the first substrate and an edge portion of the second substrate to thereby apply the filler to the gap;

a curing device configured to cure the applied filler; and an infrared imaging device configured to emit infrared light to an edge portion of the laminated substrate, receive infrared light reflected from the edge portion of the laminated substrate, and generate an image of the edge portion of the laminated substrate to which the filler is applied, and the operation controller is configured to determine a filling state of the filler applied to the gap and cured based on the image.

14. The substrate processing apparatus according to claim 13, wherein the operation controller is further configured to instruct the filler application module based on the filling state to cause the application device to terminate application of the filler.

15. The substrate processing apparatus according to claim 13, wherein the operation controller is further configured to instruct the filler application module based on the filling state to additionally apply the filler.

16. The substrate processing apparatus according to claim 13, wherein the filler application module further includes a rotating mechanism configured to rotate the substrate holder.

17. The substrate processing apparatus according to claim 16, wherein the operation controller is configured to change an applying condition for the filler based on the filling state.

18. The substrate processing apparatus according to claim 13, wherein the curing device is disposed downstream of the application device in a rotating direction of the laminated substrate, and the infrared imaging device is disposed downstream of the curing device in the rotating direction of the laminated substrate.

* * * * *